G. T. FIELDING.
SECTIONAL RIM.
APPLICATION FILED APR. 17, 1916.
1,203,996. Patented Nov. 7, 1916.
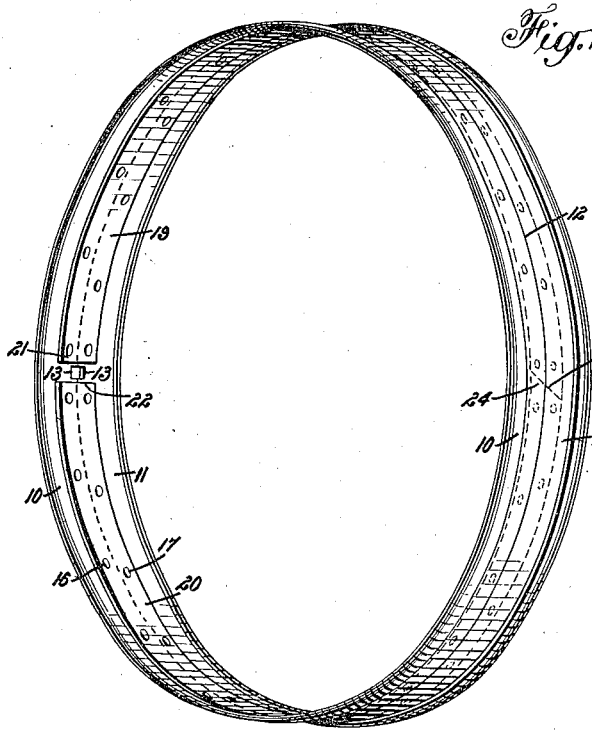
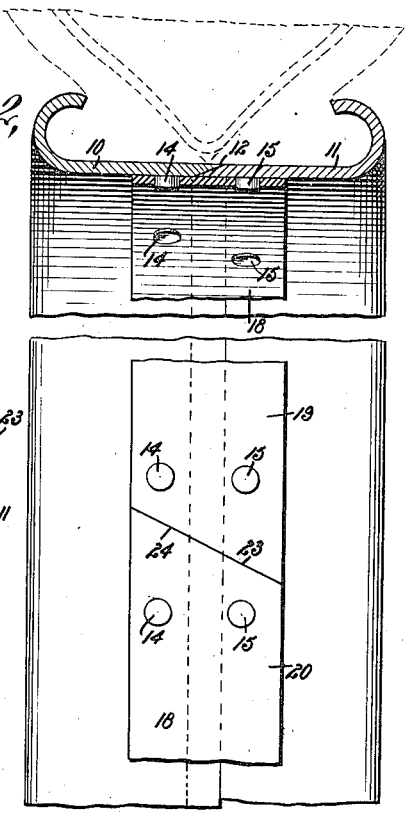
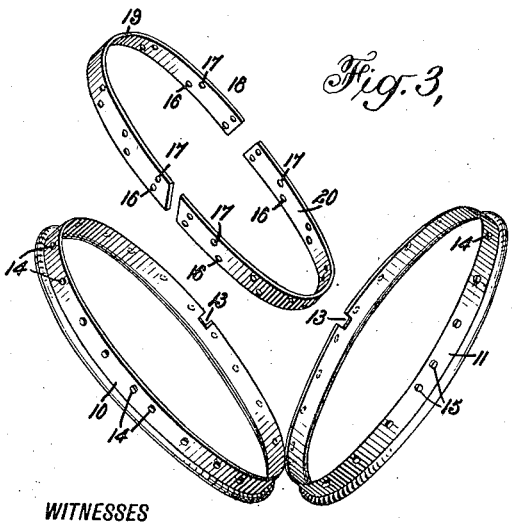
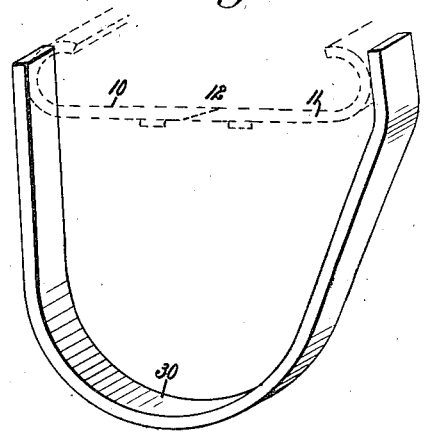
WITNESSES
INVENTOR
George T. Fielding
BY
ATTORNEYS

UNITED STATES PATENT OFFICE.

GEORGE THOMAS FIELDING, OF NEW YORK, N. Y., ASSIGNOR OF ONE-HALF TO WILLIAM T. HORNADAY, OF NEW YORK, N. Y.

SECTIONAL RIM.

1,203,996.  Specification of Letters Patent.  Patented Nov. 7, 1916.

Application filed April 17, 1916. Serial No. 91,618.

*To all whom it may concern:*

Be it known that I, GEORGE T. FIELDING, a citizen of the United States, and a resident of the city of New York, borough of the Bronx, in the county of Bronx and State of New York, have invented a new and Improved Sectional Rim, of which the following is a full, clear, and exact description.

The invention relates to tire-carrying rims for vehicle wheels, and its object is to provide a new and improved sectional rim arranged to permit of quickly assembling the sections and securely fastening the same together for properly supporting the tire or unlocking and disconnecting the rim sections for convenient removal of the rim sections from the wheel with the view of removing the tire.

In order to accomplish the desired result, use is made of a two-part rim separated circumferentially with the inner edges of the rim parts forming a lapped joint, lugs on the inner faces of the rim parts, and a locking ring made in sections separated transversely at approximately diametrically opposite points, the locking ring fitting onto the inner face of the rim and covering the joint thereof and the locking ring having sets of apertures engaging said lugs.

A practical embodiment of the invention is represented in the accompanying drawings forming a part of this specification, in which similar characters of reference indicate corresponding parts in all the views.

Figure 1 is a perspective view of the sectional rim; Fig. 2 is an enlarged cross section of the same; Fig. 3 is a perspective view of the rim with the parts disassembled; and Fig. 4 is a perspective view of one of the clamps used in assembling the rim parts.

The rim illustrated in the drawings is of the clencher type and is formed of two annular parts 10 and 11 having their inner edges beveled to form a smooth or lapped joint 12, as plainly indicated in Fig. 2. The rim parts 10 and 11 have registering cut-out portions 13 at the inner edges to provide a passage for the usual valve of the tire, as will be readily understood by reference to Fig. 1. The inner faces of the rim parts 10 and 11 are provided near their inner edges with radially disposed lugs or studs 14 and 15, preferably of cylindrical shape, and adapted to be engaged by apertures 16 and 17 formed in a sectional locking ring 18 fitting against the inner faces of the rim parts 10 and 11 extending over the joint 12, as plainly indicated in the drawings. The locking ring 18 is preferably of spring metal and is made in two parts 19 and 20 separated in a transverse direction to allow of placing the locking ring parts in position one after the other, and in a like manner removing the same from the rim parts 10 and 11. The ring sections 19 and 20 have the ends 21, 22 adjacent the cut-out portions 13 spaced apart, as plainly indicated in Fig. 1, to provide a passage for the tire valve; the other ends 23, 24 of the locking ring sections 19 and 20 are cut at a bias and abut, as plainly shown in Figs. 1 and 2. The apertures 16 and 17 adjacent the ends 21, 22 and 23, 24 are arranged in transverse alinement and the corresponding lugs or studs 14 and 15 are similarly disposed on the rim parts 10 and 11. The remaining apertures 16 and 17 and the corresponding lugs or studs 14, 15 are staggered, as plainly illustrated in the drawings.

In assembling the sectional rim use is preferably made of a few U-shaped spring clamps 30, of which one is shown in Fig. 4. These clamps 30 are engaged with the outer edges of the rim parts 10 and 11, to hold the latter in assembled position while placing the locking ring sections 19 and 20 in position. In order to do so one locking ring section is first engaged at its square cut end with the lugs or studs 14 and 15 adjacent the cut-out portions 13 and then this section is gradually engaged with the remaining lugs or studs 14 and 15 until the other beveled end is reached. In a similar manner the other locking ring section is placed in position and its apertures are engaged with the lugs or studs 14 and 15 so that the two rim parts 10 and 11 are securely locked together. It is understood that the locking ring sections owing to their resiliency can be quickly snapped in place on the inner face of the rim with the apertures 16 and 17 engaging the corresponding lugs or studs 14 and 15.

When it is desired to remove the locking ring for separating the rim parts 10 and 11, it is only necessary for the operator to insert the sharp end of a screw driver or a similar tool between a locking ring section and the rim at one end of the corresponding locking ring section to pry out this end from the corresponding lugs or studs 14 and 15 and in doing so the remainder quickly disengages itself from the rim. In case the locking ring sticks the prying operation is quickly repeated with the other remaining portions of the locking ring section to disengage its apertures from the lugs or studs to finally remove the ring section from the tire. The same operation is repeated with the other locking ring sections to completely unlock the rim parts 10 and 11 and thereby allow of separating the same.

It is understood that when assembling the rim parts the tire is placed on the assembled parts in deflated position and after the rim parts are locked together by the ring 18, as above described, then the tire may be inflated and the rim placed in position on the wheel and fastened thereto in the usual manner.

From the foregoing it will be seen that by the arrangement described, the rim parts can be very quickly assembled and securely locked together or unlocked and separated whenever it is desired to do so.

Having thus described my invention, I claim as new and desire to secure by Letters Patent:—

The combination of a two-part rim separated circumferentially, the inner edges of the two rim parts being constructed to form a smooth joint, lugs on the inner face of the rim and located on the rim parts at opposite sides of their joint, the inner peripheral edges of the rim parts having cut-out registering portions for the passage of the tire valve, and a locking ring made in sections separated transversely at approximately diametrically opposite points and fitting onto the inner face of the rim, the locking ring covering the joint and having sets of apertures engaging the said lugs, the adjacent ends of the ring section being spaced apart at the said cut-out portions of the rim parts for the passage of the tire valve and the other adjacent ends thereof being beveled in meeting relation, the engaging lugs and apertures adjacent the ends of the ring sections being transversely alined, and the remaining lugs and apertures being in staggered relation.

GEORGE THOMAS FIELDING.